US010931605B2

(12) United States Patent
Chen et al.

(10) Patent No.: US 10,931,605 B2
(45) Date of Patent: Feb. 23, 2021

(54) EVENT PROCESSING METHOD AND APPARATUS

(71) Applicant: TENCENT TECHNOLOGY (SHENZHEN) COMPANY LIMITED, Shenzhen (CN)

(72) Inventors: Xinming Chen, Shenzhen (CN); Liang Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 112 days.

(21) Appl. No.: 16/178,960

(22) Filed: Nov. 2, 2018

(65) Prior Publication Data

US 2019/0073240 A1 Mar. 7, 2019

Related U.S. Application Data

(63) Continuation of application No. PCT/CN2017/083560, filed on May 9, 2017.

(30) Foreign Application Priority Data

May 10, 2016 (CN) .......................... 201610307015.1

(51) Int. Cl.
*H04L 12/58* (2006.01)
*G06Q 30/02* (2012.01)
(Continued)

(52) U.S. Cl.
CPC ............ *H04L 51/04* (2013.01); *G06F 9/4843* (2013.01); *G06F 9/5072* (2013.01); *G06F 9/542* (2013.01);
(Continued)

(58) Field of Classification Search
CPC ...... G06F 9/4843; G06F 9/5072; G06F 9/542; G06Q 30/02; G06T 13/80; H04L 67/1044; H04L 67/10; H04L 51/04; H04L 51/18
See application file for complete search history.

(56) References Cited

U.S. PATENT DOCUMENTS

| 8,696,426 B2 * | 4/2014 | Walker | G07F 17/32 463/16 |
| 2010/0199340 A1 * | 8/2010 | Jonas | G06Q 10/10 726/8 |

(Continued)

FOREIGN PATENT DOCUMENTS

| CN | 103973769 A * | 8/2014 | ............ H04L 67/06 |
| CN | 105142033 A | 2/2015 | |

(Continued)

OTHER PUBLICATIONS

Wei Liu, Xudong He, and Peiyi Zhang; 2015; "Application of Red Envelopes—New Weapon of WeChat Payment", 2015 International Conference on Education, Management, Information and Medicine. Atlantis Press. (Year: 2015).*

(Continued)

*Primary Examiner* — Jacob D Dascomb
(74) *Attorney, Agent, or Firm* — Oblon, McClelland, Maier & Neustadt, L.L.P.

(57) ABSTRACT

This application discloses an event processing method and apparatus. A first communication request is received by a server system from a first terminal device. A second communication request is received by the server system from one or more second terminal devices. The first terminal device and the one or more second terminal devices are added to a same communication group by processing circuitry of the server system. A task to be executed at the one or more second terminal devices is sent to the one or more (Continued)

second terminal devices via the same communication group. A task execution result is received that is associated with task execution by the one or more second terminal devices that execute the task. An event object associated with the task is sent by the server system to the one or more second terminal devices that execute the task when the task execution result satisfies a predetermined condition.

19 Claims, 11 Drawing Sheets

(51) Int. Cl.
G06F 9/48 (2006.01)
G06F 9/50 (2006.01)
G06F 9/54 (2006.01)
G06T 13/80 (2011.01)
H04L 29/08 (2006.01)

(52) U.S. Cl.
CPC ............ *G06Q 30/02* (2013.01); *G06T 13/80* (2013.01); *H04L 67/1044* (2013.01); *H04L 67/10* (2013.01)

(56) References Cited

U.S. PATENT DOCUMENTS

2014/0156757 A1* 6/2014 Zhang ................ H04L 12/1822
　　　　　　　　　　　　　　　　　　　　　　　　　709/204
2016/0234302 A1* 8/2016 Wu ...................... G06Q 20/123

FOREIGN PATENT DOCUMENTS

| CN | 104484144 A | 4/2015 |
| CN | 204360714 U | 5/2015 |
| CN | 105183410 A | 12/2015 |
| CN | 105427135 A | 3/2016 |
| CN | 105931081 A | 9/2016 |

OTHER PUBLICATIONS

Office Action dated Mar. 14, 2019 in Chinese Patent Application No. 201610307015.1, with partial English translation.
International Preliminary Report on Patentability and Written Opinion dated Nov. 13, 2018 in PCT/CN2017/083560, with English translation.
International Search Report dated Aug. 14, 2017 in PCT/CN2017/083560 (with English Translation).
Written Opinion dated Aug. 14, 2017 in PCT/CN2017/083560.

* cited by examiner

EVENT PROCESSING METHOD AND APPARATUS

RELATED APPLICATION

This application is a continuation of International Application No. PCT/CN2017/083560, filed on May 9, 2017, which claims priority to Chinese Patent Application No. 201610307015.1, entitled "EVENT PROCESSING METHOD AND APPARATUS" filed with the Chinese Patent Office on May 10, 2016. The entire disclosures of the prior applications are hereby incorporated by reference in their entirety.

FIELD OF THE TECHNOLOGY

This application relates to the field of communication technologies, and specifically, to an event processing method and apparatus.

BACKGROUND OF THE DISCLOSURE

Internet services generally use a manner of periodically performing controlling by a back end. For example, in a 'grabbing red envelopes' activity during the Spring Festival Gala, a red envelope opening time is preset in the back end. When the specified time is reached, a page is refreshed, and red envelopes are displayed on the page for the user to grab. The implementation of such an Internet service is not suitable for off-line services, and such an Internet service is easy to be forgotten by users because the Internet service lacks interaction with users before sending the red envelopes. It may be obtained by summarizing the implementation of the foregoing Internet service that, the 'grabbing red envelopes' activity in the Internet service may be considered as a task event, and the red envelope may be considered as an event object corresponding to the task event. In the foregoing Internet service, in the manner of periodically sending the event object by the back end, interaction with users cannot be performed before the event object is sent, thereby severely affecting the implementation efficiency of the Internet service.

SUMMARY

Embodiments of this application provide an event processing method and apparatus, to at least resolve a technical problem that interaction with a user cannot be performed before an event object is sent due to the use of a manner of periodically sending the event object by a back end.

According to one aspect of the embodiments of this application, a method is provided. A first communication request is received by a server system from a first terminal device. A second communication request is received by the server system from one or more second terminal devices. The first terminal device and the one or more second terminal devices are added by processing circuitry of the server system to a same communication group. A task to be executed at the one or more second terminal devices is sent to the one or more second terminal devices via the same communication group. A task execution result is received that is associated with task execution by the one or more second terminal devices that execute the task. An event object that is associated with the task is sent by the server system to the one or more second terminal devices that execute the task when the task execution result satisfies a predetermined condition.

According to another aspect of the embodiments of this application, an information processing system is provided. The information processing system includes processing circuitry that receives a first communication request from a first terminal device and a second communication request from one or more second terminal devices. The processing circuitry adds the first terminal device and the one or more second terminal devices to a same communication group and sends, to the one or more second terminal device, a task to be executed at the one or more second terminal devices. The processing circuitry receives a task execution result associated with task execution by the one or more second terminal devices that execute the task. Further the processing circuitry sends an event object that is associated with the task to the one or more second terminal devices that execute the task when the task execution result satisfies a predetermined condition.

According to another aspect of the embodiments of this application, a non-transitory computer-readable medium is provided. The non-transitory computer-readable medium stores a program executable by at least one processor to perform receiving of a first communication request from a first terminal device and a second communication request from one or more second terminal devices. The first terminal device and the one or more second terminal devices are added to a same communication group. A task to be executed at the one or more second terminal devices is sent to the one or more second terminal devices via the same communication group. A task execution result associated with task execution by the one or more second terminal devices that execute the task is received. An event object associated with the task is sent to the one or more second terminal devices that execute the task when the task execution result satisfies a predetermined condition.

In the embodiments of this application, a to-be-executed task event is sent to a terminal device, an event result obtained after the terminal device executes the task event is acquired, and an event object corresponding to the task event is sent to the terminal device, when the event result satisfies a predetermined condition, so that interaction with the terminal device is performed before the event object corresponding to the task event is sent, a technical effect of improving interactivity between a server and the terminal device is achieved, and a technical problem that interaction with a user cannot be performed before an event object is sent due to the use of a manner of periodically sending the event object by a back end is further resolved.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the figures.

DESCRIPTION OF EMBODIMENTS

To make a person skilled in the art understand the solutions in this application better, the following clearly describes the technical solutions in the embodiments of this application with reference to the accompanying drawings in the embodiments of this application. The described embodiments are merely some but not all of the embodiments of this application. All other embodiments obtained by a person of ordinary skill in the art based on the embodiments of this application shall fall within the protection scope of this application.

It should be noted that in the specification, claims, and accompanying drawings of this application, the terms "first", "second", "third", "fourth", and so on are intended to distinguish between similar objects but do not necessarily indicate a specific order or sequence. It should be understood that, data used in this way is exchangeable in a proper case, so that the embodiments described herein of this application can be implemented in another order except those shown or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

First, some nouns or terms that occur in the description process of the embodiments of this application can be explained as follows:

WebSocket is a protocol provided for full duplex communication performed on a single TCP connection since HTML5. In a WebSocket API, a browser and a server can perform a handshake action for one time. That is, a fast communication channel may be formed between the browser and the server for bidirectional transmission of data.

According to an embodiment of this application, an event processing method is provided.

Figure 1:
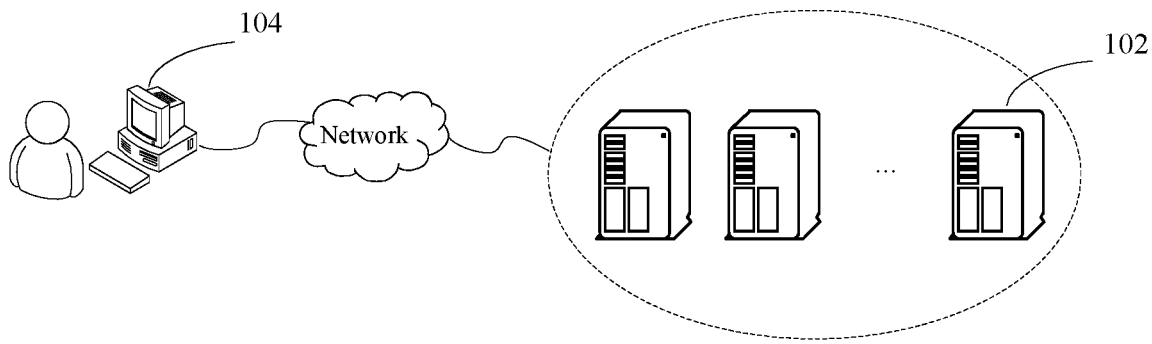
FIG. 1 is a schematic diagram of a hardware environment of an event processing method according to an embodiment of this application.

In this embodiment, the foregoing event processing method may be applied to a hardware environment constructed by a server 102 and a terminal 104 shown in FIG. 1. As shown in FIG. 1, the server 102 is connected to the terminal 104 by using a network. The network includes but is not limited to: a wide area network, a metropolitan area network, or a local area network. The terminal 104 includes but is not limited to: a PC, a mobile phone, a tablet computer, and the like. The event processing method in this embodiment of this application may be executed by the server 102 or may be executed by the terminal 104, or may be executed together by the server 102 and the terminal 104. The event processing method executed by the terminal 104 in this embodiment of this application may alternatively be executed by a client installed on the terminal 104.

Figure 2:
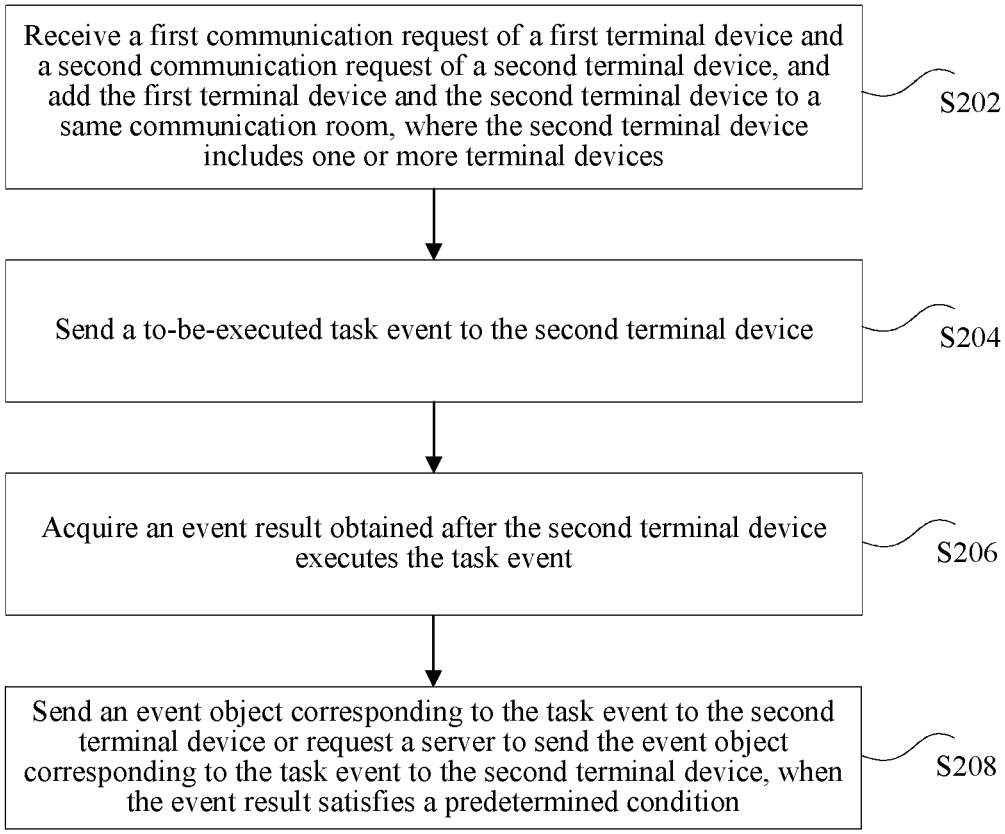
FIG. 2 is a flowchart of an event processing method according to an embodiment of this application.

FIG. 2 is a flowchart of an event processing method according to an embodiment of this application. As shown in FIG. 2, the method may include the following steps:

In step S202, receive a first communication request of a first terminal device and a second communication request of a second terminal device, and add the first terminal device and the second terminal device to a same communication group (e.g. a same communication room), where the second terminal device includes one or more terminal devices.

In step S204, end a to-be-executed task event to the second terminal device.

In step S206, acquire a task execution result (or an event result) obtained after the second terminal device executes the task event.

In step S208, send an event object corresponding to the task event to the second terminal device or request a server to send the event object corresponding to the task event to the second terminal device, when the event result satisfies a predetermined condition.

In this embodiment of this application, the foregoing steps may be executed by a WebSocket server, or may be executed by a server of another type.

By means of the foregoing steps S202 to S208, a to-be-executed task event is sent to a terminal device, an event result obtained after the terminal device executes the task event is acquired, and an event object corresponding to the task event is sent to the terminal device, when the event result satisfies a predetermined condition, so that interaction with the terminal device is performed before the event object corresponding to the task event is sent, a technical problem that interaction with a user cannot be performed before an event object is sent due to the use of a manner of periodically sending the event object by a back end is further resolved, and a technical effect of improving interactivity between a server and the terminal device is achieved.

In the technical solution provided by step S202, the first terminal device may be a terminal device such as a computer or a mobile phone. The first terminal device may include a communications apparatus, and the first communication request is sent to the WebSocket server by using the communications apparatus. The communications apparatus in the first terminal device may be a wired communications apparatus, or may be a wireless communications apparatus such as Bluetooth or WiFi. The first terminal device sends the first communication request to the WebSocket server by using the communications apparatus, so as to establish a communication connection between the first terminal device and the WebSocket server. The communication connection between the first terminal device and the WebSocket server may be a wired connection, or may be a wireless connection. In this embodiment of this application, the first communication request sent by the first terminal device to the WebSocket server may carry information such as a communication identifier, an IP address of the first terminal device, and a device identifier of the first terminal device.

The second terminal device may also be a terminal device such as a computer or a mobile phone. The second terminal device may also include a communications apparatus, and the second communication request is sent to the WebSocket server by using the communications apparatus. The communications apparatus in the second terminal device may be a wired communications apparatus, or may be a wireless communications apparatus such as Bluetooth or WiFi. The second terminal device may send the second communication request to the WebSocket server by using the communications apparatus, so as to establish a communication connection between the second terminal device and the WebSocket server. The communication connection between the second terminal device and the WebSocket server may be a wired connection, or may be a wireless connection. In this embodiment of this application, the second communication request sent by the second terminal device to the WebSocket server may carry information such as a communication identifier, an IP address of the second terminal device, and a device identifier of the second terminal device.

In this embodiment of this application, the first terminal device and the second terminal device may be of a same type, or may be of different types. Information included in the first communication request sent by the first terminal device to the WebSocket server and information included in the second communication request sent by the second terminal device to the WebSocket server may include but are not limited to the foregoing exemplary content, and the first communication request and the second communication request may further include other content.

In this embodiment of this application, the first terminal device and the second terminal device may be added to a same communication room. The communication room in this embodiment of this application may further include other terminal devices in addition to the first terminal device and the second terminal device. In this embodiment of this application, the number of terminal devices included in the communication room and the type of each terminal device added to the communication room are not specifically limited. There may be one or two or more terminal devices added to the same communication room, and the terminal devices of different types in the communication room may communicate with each other. The communication group (e.g., the communication room) may be understood as a communication bandwidth or a communication resource allocated by the server to the two or more terminal devices for communication. The two or more terminal devices in the same communication room may communicate with each other, which includes exchanging messages, transmitting information, and the like. In addition, any terminal device in the communication room may further broadcast a communication message to other terminal devices, and the other terminal devices all can receive the communication message broadcast by the terminal device. The communication room in this embodiment of this application may support real-time adding or leaving of the terminal device. That is, in a communication process of all the terminal devices in the communication room, any other one or more terminal devices may be added to the communication room at any time to join in the communication process, and the any other one or more terminal devices may leave the communication room at any time. The manner in which the terminal devices are added to or leaves the communication room may implement an objective that the terminal device communicates with the terminal devices in the same communication room.

In an application scenario, the sequence of receiving the first communication request and the second communication request is not specifically limited in this embodiment of this application. The first communication request and the second communication request do not indicate a specific sequence. The WebSocket server may first receive the first communication request sent by the first terminal device, or may first receive the second communication request sent by the second terminal device, or may receive at the same time the first communication request sent by the first terminal device and the second communication request sent by the second terminal device. It is assumed that the WebSocket server first receives the first communication request. After receiving the first communication request sent by the first terminal device, the WebSocket server responds to the first communication request, allocates a communication room to the first communication request, and send an acknowledgment message to the first terminal device to notify that the first terminal device has successfully established a communication connection between the first terminal device and the WebSocket server. Meanwhile, the WebSocket server may further send information such as an identifier of the allocated communication room to the first terminal device. In this embodiment of this application, the communication room allocated by the WebSocket server may be used for a communication session, message exchange, and the like between the first terminal device and the WebSocket server. The acknowledgment message returned by the WebSocket server to the first terminal device may carry information such as the identifier of the communication room. By allocating a communication room, the WebSocket server can better add the first terminal device and the second terminal device to the communication room for communication after receiving the second communication request sent by the second terminal device. Specifically, after receiving the second communication request, the WebSocket server responds to the second communication request, adds the second terminal device to the communication room, and send an acknowledgment message to the second terminal device to notify that the second terminal device has successfully established a communication connection between the second terminal device and the WebSocket server. Meanwhile, the WebSocket server may further send information such as an identifier of the communication room to the second terminal device. The first terminal device and the second terminal device may perform processes such as a communication session and message exchange in the communication room. In this embodiment of this application, the first terminal device and the second terminal device are added to the same communication room, and communication between the first terminal device and the second terminal device can be implemented.

In this embodiment of this application, the numbers of the first terminal device and the second terminal device added to the same communication room are not specifically limited. There may be one first terminal device, or may be a plurality of first terminal devices. There may be one second terminal device, or may be a plurality of second terminal devices. That is, the first terminal device may include one or more terminal devices, and the second terminal device may also include one or more terminal devices.

In the technical solution provided in step S204, that the WebSocket server sends a to-be-executed task event to the second terminal device may be set or adjusted according to a requirement in an actual case. The to-be-executed task event sent by the WebSocket server to the second terminal device in this embodiment of this application is not specifically limited. For example, the to-be-executed task event sent by the WebSocket server to the second terminal device may include but is not limited to the following types: an H5 small game on a mobile phone, giving a thumbs-up, answering a predetermined question, shouting encouragement, and the like. The WebSocket server may send the to-be-executed task event to one or more terminal devices in the second terminal device, and the to-be-executed task event needs to be done by terminal device users by using the terminal devices. In this embodiment of this application, the to-be-executed task event sent by the WebSocket server to the one or more terminal devices separately in the second terminal device may be the same or may be different.

In an application scenario, the WebSocket server may send the to-be-executed task event to the one or more terminal devices in the second terminal device in the following manners: The first terminal device may send a task event trigger request to the WebSocket server when receiving a control command. The task event trigger request is used to instruct the WebSocket server to send a to-be-executed task event to the second terminal device. The control command may be used to indicate that an event processing procedure starts. After receiving the task event trigger request sent by the first terminal device, the WebSocket server sends the to-be-executed task event to one or more terminal devices of the second terminal device. After receiving the to-be-executed task event, the one or more terminal devices in the second terminal device may display the to-be-executed task event on the one or more terminal devices in the second terminal device. For example, if the second terminal device is a mobile phone and the to-be-executed task event is giving a thumbs-up, after receiving the task event of giving a thumbs-up sent by the WebSocket server, the mobile phone displays a thumbs-up giving interface.

In the technical solution provided in the step S206, after the one or more terminal devices in the second terminal device receive the to-be-executed task event sent by the WebSocket server, the terminal device user may execute the task event by using the second terminal device. For example, the user may give a thumbs-up on a thumbs-up giving interface on a touchscreen of a mobile phone. After executing, by using the second terminal device, the task event sent by the terminal device, the terminal device user may return an event result obtained by executing the task event to the WebSocket server. For example, the event result obtained by executing the task event of giving a thumbs-up is the number of thumbs-ups. In this embodiment of this application, the one or more terminal devices in the second terminal device may separately send the event result obtained by executing the task event to the WebSocket server. The WebSocket server performs combination processing on the event results after acquiring the event results returned by the one or more terminal devices in the second terminal device, to obtain the event result corresponding to the task event. For example, the second terminal device includes three mobile phones, and the task event is giving a thumbs-up. The mobile phones separately execute the task event of giving a thumbs-up, and an obtained event result is the number of thumbs-ups, which are respectively 6, 8, and 13. The three mobile phones separately return the event results to the WebSocket server. After acquiring the event results returned by the mobile phones, the WebSocket server performs combined processing to obtain the event result of the task event of giving a thumbs-up: 6+8+13=27. That is, the event result of the task event of giving a thumbs-up is 27.

Each terminal device in the second terminal device may display an event result obtained by executing the task event, and may further display an event result obtained after the WebSocket server performs combined processing on the event results obtained by the one or more terminal devices in the received second terminal device by executing the task event. For example, the second terminal device includes three mobile phones. After each mobile phone executes the task event of giving a thumbs-up, the mobile phone may display the number of thumbs-ups thereon, and may further display the total number of thumbs-ups of all mobile phones. In this embodiment of this application, after acquiring the event result obtained by executing the task event by the one or more terminal devices in the second terminal device, the WebSocket server may perform combined processing to obtain the event result of the task event, and then send the event result of the task event to the first terminal device and the second terminal device for synchronous displaying, so that the terminal device user can better view the event result of the task event. In this embodiment of this application, a display manner and a display position of the event result that is received by the one or more terminal devices in the second terminal device and that is sent by the WebSocket server, and the event result of executing the task event by each terminal device are not specifically limited, and may be adjusted according to the type of the second terminal device.

In the technical solution provided in the step S208, after receiving the event result sent by the one or more terminal devices in the second terminal device after the one or more terminal devices in the second terminal device executes the task event, the WebSocket server may perform combined processing to obtain the event result of the task event. In this embodiment of this application, whether the event result of the task event satisfies a predetermined condition may be detected in real time. The predetermined condition may be set or adjusted according to the task event. For example, when the task event is giving a thumbs-up, the predetermined condition may be that the number of thumbs-ups exceeds a predetermined number, for example, 30. When detecting that the event result obtained by the second terminal device by executing the task event satisfies the predetermined condition, the WebSocket server may send an event object corresponding to the task event to the second terminal device. In this embodiment of this application, the WebSocket server may further request another server to send the event object corresponding to the task event to the second terminal device. In this embodiment of this application, the types of the servers requested by the WebSocket server are not specifically limited by the embodiments of this application, and the another server may be a server for an instant messaging application. For example, the event object is a WeChat red envelope, and the WebSocket server may request a WeChat application server to send a WeChat red envelope to the second terminal device. In this embodiment of this application, the event object corresponding to the task event is not specifically limited, and may be set according to a requirement in an actual case. For example, when the task event is giving a thumbs-up, an event object corresponding to the task event of giving a thumbs-up may be a red envelope, and when the number of thumbs-ups exceeds a predetermined number, the server may send a red envelope to one or more terminal devices in the second terminal device. In one embodiment of this application, the foregoing event object is a red envelope. In this embodiment of this application, the event object may alternatively be a coupon or an admission ticket.

In an application scenario, after the WebSocket server sends the event object corresponding to the task event to the one or more terminal devices in the second terminal device or the WebSocket server requests another server to send the event object corresponding to the task event to the one or more terminal devices in the second terminal device, each terminal device may display the received event object. For example, if the event object sent by the server is a red envelope, the terminal device may display the red envelope. In this embodiment of this application, a display manner and a display position of the event object received by the second terminal device are not specifically limited, and may be adjusted according to the type of the second terminal device.

Figure 3:
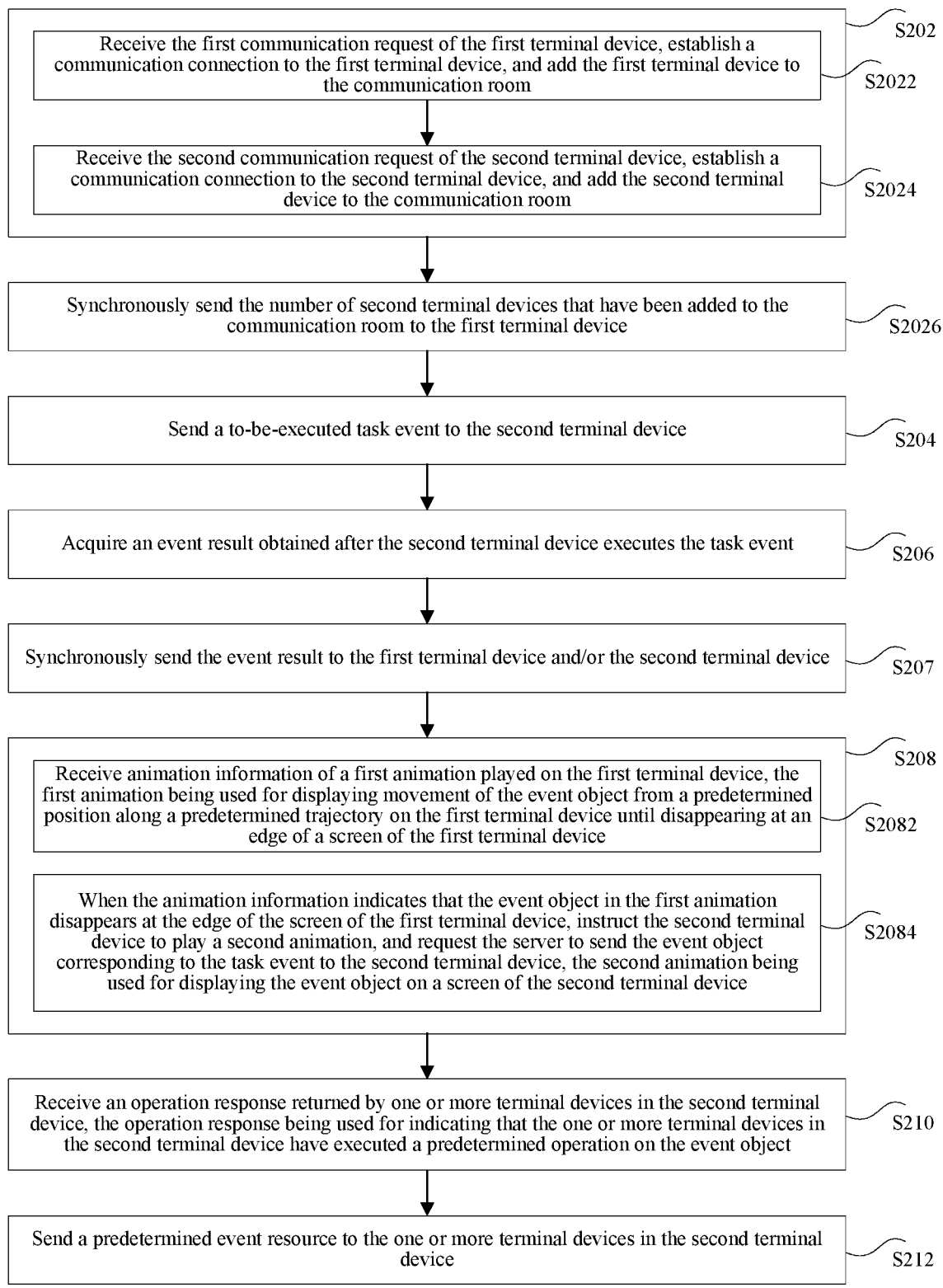
FIG. 3 is a flowchart of another event processing method according to an embodiment of this application.

FIG. 3 is a flowchart of another event processing method according to an embodiment of this application. As shown in FIG. 3, after executing step S206 of acquiring an event result obtained after the second terminal device executes the task event, this embodiment of this application may further include:

In step S207, synchronously send the event result to the first terminal device and/or the second terminal device.

In this embodiment of this application, after acquiring the event result obtained by the one or more terminal devices in the second terminal device after the one or more terminal devices in the second terminal device executes the task event, the WebSocket server may perform combined processing to obtain the event result of the task event. The WebSocket server may send the obtained event result to the one or more terminal devices in the first terminal device and the second terminal device for displaying, or may send the obtained event result to the first terminal device, or send the obtained event result to the one or more terminal devices in the second terminal device for displaying. A display manner and a display position of the event result of the task event on the first terminal device and the second terminal device are not specifically limited in this embodiment of this application, and may be adjusted according to the types of the first terminal device and the second terminal device.

In this embodiment of this application, the WebSocket server synchronously sends the event result of the task event to the first terminal device and/or the second terminal device for displaying, so that a terminal device user can better view the event result of the task event.

After step S208 of sending an event object corresponding to the task event to the second terminal device, the method further includes the following steps:

In step S210, receive an operation response returned by one or more terminal devices in the second terminal device, the operation response being used for indicating that the one or more terminal devices in the second terminal device have executed a predetermined operation on the event object.

In the technical solution provided in step S210, after the one or more terminal devices in the second terminal device receive the event object sent by the WebSocket server or the event object that is request by the WebSocket server and that is sent by another server, the terminal device user may execute a predetermined operation on the received event object. The predetermined operation may include but is not limited to operations such as clicking (or tapping) (including one-tapping, double-tapping, and the like), holding, and dragging. After receiving the predetermined operation executed by the terminal device user on the event object, the one or more terminal devices in the second terminal device may return an operation response corresponding to the predetermined operation executed by the terminal device user on the event object, to the WebSocket server or the another server requested by the WebSocket server. The operation response may be used to indicate that the one or more terminal devices in the second terminal device have executed the predetermined operation on the event object.

In step S212, send a predetermined event resource to the one or more terminal devices in the second terminal device.

In the technical solution provided in step S212, after the WebSocket server or the another server requested by the WebSocket server receives the operation response returned by the one or more terminal devices in the second terminal device, the WebSocket server or the another server may send a predetermined event resource to the one or more terminal devices in the second terminal device. The predetermined event resource is not specifically limited this embodiment of this application, and may be set or adjusted according to the type of the task event. For example, when the task event is giving a thumbs-up, and an event result obtained by executing the task event of giving a thumbs-up satisfies the predetermined condition, that is, the number of thumbs-up reaches a preset number, the WebSocket server or the another server request by the WebSocket server may send a red envelope to the one or more terminal devices in the second terminal device. The terminal device user may execute a tapping operation on the red envelope, and send an operation response corresponding to the tapping operation to the WebSocket server or the another server requested by the WebSocket server. After the WebSocket server or the another server requested by the WebSocket server receives the operation, the WebSocket server or the another server requested by the WebSocket server may send the amount of money corresponding to the red envelope to the one or more terminal devices in the second terminal device. For example, the event object may alternatively be coupon, and correspondingly, the event resource is a favorable price corresponding to the coupon.

In this embodiment, it is set that a terminal device user can execute a predetermined operation on a received event object, so that an effect of interactivity between a server and the terminal device user can be further improved. In addition, in this embodiment, an event resource corresponding to the predetermined operation executed on the event object is sent by using a terminal device, and the enthusiasm of participation of the terminal device user can be improved.

In this embodiment of this application, step S212 of sending a predetermined event resource to the one or more terminal devices in the second terminal device may include:

transferring the event resource into a first account, the first account being a login account of the one or more terminal devices in the second terminal device.

In this embodiment of this application, the first account may be a login account of the one or more terminal devices in the second terminal device. For example, when the one or more terminal devices in the second terminal device are mobile phones, the first account may be an ID account of the mobile phone user. The first account may alternatively be an account of an application installed on the one or more terminal devices in the second terminal device, such as an instant messaging application account. The first account is not specifically limited in this embodiment of this application. In addition to the foregoing two accounts, the first account may further be another account of the terminal device user. The WebSocket server or the another server requested by the WebSocket server may send a predetermined event resource to the one or more terminal devices in the second terminal device, and transfer the event resource to the first account. For example, the predetermined event resource sent by the WeChat application server to the one or more terminal devices in the second terminal device is the amount of money in the red envelope. Correspondingly, the amount of money in the red envelope may be transferred to a mobile phone ID account, a WeChat account, and the like.

In this embodiment of this application, the event resource sent by the WebSocket server or the event resource that is requested by the WebSocket server and that is sent by the another server is transferred to the login account of the one or more terminal devices in the second terminal device, and the terminal device user does not need to perform a relevant operation and the event resource is transferred, thereby providing great convenience for the terminal device user.

In this embodiment of this application, step S202 of receiving a first communication request of a first terminal device and a second communication request of a second terminal device, and adding the first terminal device and the second terminal device to a same communication room may include the following steps:

In step S2022, receive the first communication request of the first terminal device, establish a communication connection to the first terminal device, and add the first terminal device to the communication room.

In step S2024, receive the second communication request of the second terminal device, establish a communication connection to the second terminal device, and add the second terminal device to the communication room.

In this embodiment of this application, a time sequence of receiving the first communication request and the second communication request by the WebSocket server is not limited in the steps. That is, the WebSocket server may first receive the first communication request, or may first receive the second communication request. However, regardless of first receiving the first communication request or first receiving the second communication request, the WebSocket server allocates a communication room, and when receiving the communication request again, adds a terminal device corresponding to the communication request to the communication room.

It is assumed that the WebSocket server first receives the first communication request. After receiving the first communication request sent by the first terminal device, the WebSocket server responds to the first communication request, allocates a communication room to the first communication request, and send an acknowledgment message to the first terminal device to notify that the first terminal device has successfully established a communication connection between the first terminal device and the WebSocket server. Meanwhile, the WebSocket server may further send information such as an identifier of the allocated communication room to the first terminal device. In this embodiment of this application, the communication room allocated by the WebSocket server may be used for a communication session, message exchange, and the like between the first terminal device and the WebSocket server. In this embodiment of this application, the acknowledgment message returned by the WebSocket server to the first terminal device may carry information such as the identifier of the communication room. By allocating a communication room, the WebSocket server can better add the first terminal device and the second terminal device to the communication room for communication, after receiving the second communication request sent by the second terminal device. Specifically, after receiving the second communication request, the WebSocket server adds the second terminal device to the communication room in response to the second communication request, and sends an acknowledgment message to the second terminal device to notify that the second terminal device has successfully established a communication connection between the second terminal device and the WebSocket server. Meanwhile, the WebSocket server may further send information such as an identifier of the communication room to the second terminal device. The first terminal device and the second terminal device may perform processes such as a communication session and message exchange in the communication room. In this embodiment, the first terminal device and the second terminal device are added to the same communication room, and communication between the first terminal device and the second terminal device can be implemented.

After executing step S2024 of adding the second terminal device to the communication room, this embodiment of this application may further include:

In step S2026, synchronously send the number of second terminal devices that have been added to the communication room to the first terminal device.

In this embodiment of this application, the second terminal device may include one or more terminal devices, and the second communication request sent by the second terminal device to the WebSocket server may carry the number of second terminal devices, and an IP address and identifier of each terminal device. After receiving the first communication request and the second communication request, the WebSocket server may add the first terminal device and the second terminal device to a same communication room, which includes: adding the one or more terminal devices in the second terminal device to the same communication room, so that the first terminal device separately communicates with the one or more terminal devices in the second terminal device. After receiving the second communication request and adding the one or more terminal devices in the second terminal device to the communication room, the WebSocket server may synchronously send the number of second terminal devices and the IP address and identifier of each terminal device to the first terminal device, so that the first terminal device can learn of relevant information of the terminal devices communicating with the first terminal device, and the first terminal device can better communicate with the one or more terminal devices in the second terminal device. After receiving the number of second terminal devices and relevant information of terminal devices that are synchronously sent by the WebSocket server, the first terminal device may display the relevant information of the terminal devices and a communication status of the first terminal device on a display interface of the first terminal device. In this way, a user of the first terminal device can better view the relevant information of the terminal devices communicating with the first terminal device.

In this embodiment of this application, the event object may be a resource transfer request in an instant messaging application, the resource transfer request carrying indication information used for indicating an event resource to be transferred.

In this embodiment of this application, the event object sent by the WebSocket server or the event object that is requested by the WebSocket server and that is sent by the another server to the one or more terminal devices in the second terminal device may be a resource transfer request in the instant messaging application. In this embodiment of this application, the resource transfer request may be used to indicate that users of the one or more terminal devices in the second terminal device may transfer the event resource to login accounts of the terminal devices by executing a predetermined operation. For example, the event object is a WeChat red envelope, the instant messaging application is a WeChat application, and the resource transfer request may be used to instruct a WeChat user to transfer the amount of money in the red envelope to a WeChat account. The WeChat user may transfer the amount of money in the red envelope to the WeChat account by executing a tapping operation on the red envelope.

In this embodiment, an event object is set to a resource transfer request in an instant messaging application, so that a terminal device user can transfer an event resource to a login account of a terminal device by executing a predetermined operation on the event object.

In this embodiment of this application, step S208 of requesting a server to send the event object corresponding to the task event to the second terminal device when the event result satisfies a predetermined condition may include the following steps:

In step S2082, receive animation information of a first animation played on the first terminal device, the first animation being used for displaying movement of the event object from a predetermined position along a predetermined trajectory on the first terminal device until disappearing at an edge of a screen of the first terminal device.

In the technical solution provided in step S2082, the first animation may be triggered to be played on the first terminal device, the first animation being used for displaying movement of the event object from a predetermined position along a predetermined trajectory on the first terminal device until disappearing at an edge of a screen of the first terminal device. The predetermined position and the predetermined trajectory are not specifically limited in this embodiment of this application. For example, the predetermined position may be any position in the screen of the first terminal device, and the predetermined trajectory may be a vertical downward straight trajectory. In this embodiment of this application, the first animation may be triggered to be played by the WebSocket server, or may be triggered to be played by the first terminal device. For example, the event object is a WeChat red envelope, and the first animation can enable on-site users to see that WeChat red envelopes vertically fall from the screen of the first terminal device. In this embodiment, the first animation is played on the screen of the first terminal device, and a dynamic effect of the event object can be reached.

In a process of playing the first animation by the first terminal device, the first terminal device may send animation information of the first animation to the WebSocket server. In this embodiment of this application, the animation information of the first animation played on the first terminal device may include information such as real-time position of the event object, and may further include other information. The WebSocket server may receive the animation information that is sent by the first terminal device and that is for playing the first animation, and detect in real time the position of the event object in the first animation on the screen of the first terminal device according to the received animation information, so that the WebSocket server can request the another server to send the event object to the one or more terminal devices in the second terminal device when the event object disappears from the screen of the first terminal device.

In step S2084, when the animation information indicates that the event object in the first animation disappears at the edge of the screen of the first terminal device, instruct the second terminal device to play a second animation, and request the server to send the event object corresponding to the task event to the second terminal device, the second animation being used for displaying the event object on a screen of the second terminal device.

In the technical solution provided in step S2084, when detecting according to the animation information that the event object disappears at the edge of the screen of the first terminal device, the WebSocket server may send indication information to the one or more terminal devices in the second terminal device, to instruct the one or more terminal devices in the second terminal device to play a second animation. The second animation may be used to display the event object on the one or more terminal devices in the second terminal device. When the WebSocket server detects according to the animation information that the event object disappears at the edge of the screen of the first terminal device, the WebSocket server may further request the another server to send the event object to the one or more terminal devices in the second terminal device. For example, the first terminal device plays an animation in which red envelopes vertically fall down, and when the red envelopes disappear from the edge of the screen of the first terminal device, the WebSocket server instructs the second terminal device to play an animation in which the red envelopes enter a screen. At the same time, the WebSocket server further requests the WeChat server to send the red envelopes to the second terminal device. In this embodiment, the event objects visually seen by the users reach the one or more terminal devices in the second terminal device at the same time when back-end event objects reach the one or more terminal devices in the second terminal device, visual experience of the users is increased, and the use enthusiasm of the users is invoked.

This application further provides an embodiment. This embodiment uses an off-line service as an example, the task event uses giving a thumbs-up as an example, and the event object uses a red envelope as an example. In this embodiment, a WebSocket server connected to an external network is preconfigured and is to be used by a local service. On a local site, a computer (equivalent to the first terminal device in the embodiments of this application) needs to be further configured. A page program or an application program may be opened by using a browser. The page program or the application program may be a program for implementing the event processing method in the embodiments of this application.

Figure 4:
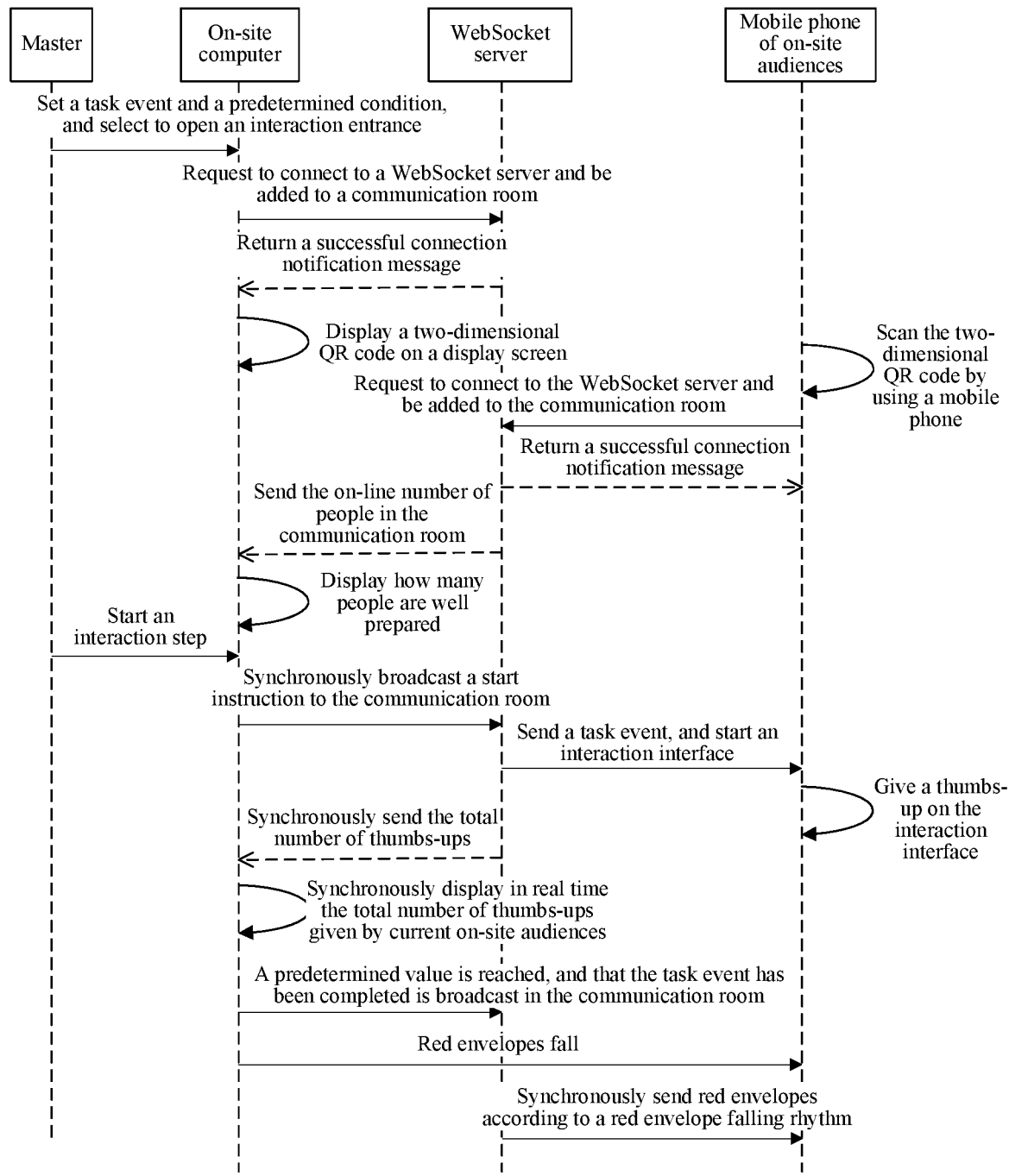
FIG. 4 is a time sequence diagram of a processing procedure of an event processing method according to an embodiment of this application.

FIG. 4 is a time sequence diagram of a processing procedure of an event processing method according to an embodiment of this application. As shown in FIG. 4, a procedure of performing an off-line service by means of the event processing method in this embodiment of this application is as follows:

A master of the off-line service may preset a task event and a predetermined condition for an on-site computer (equivalent to the first terminal device in the embodiments of this application), and select an open interaction entrance. The task event may be giving a thumbs-up, and the predetermined condition may be that the number of thumbs-ups reaches a predetermined value. A page program run on the on-site computer initiates a communication request, and requests to connect to a WebSocket server and be added to a communication room allocated by the WebSocket server. The WebSocket server returns a successful connection notification message to the on-site computer. After establishing a communication connection to the WebSocket server, the on-site computer displays, for example, a two-dimensional Quick Response (QR) code on a display screen. The two-dimensional QR code may be scanned by on-site audiences by using mobile phones to establish communication connections to the on-site computer. The on-site audiences scan the two-dimensional QR code by using the mobile phone, send a communication request to the WebSocket server, and request to connect to the WebSocket server and to be added to the communication room. The WebSocket server returns a successful connection notification message to the mobile phones of the on-site audiences. At this time, the mobile phones of the on-site audiences are well-prepared. In this embodiment of this application, at the same time of establishing a communication connection to the mobile phones of the on-site audiences, the WebSocket server may further synchronize the on-line number of people in the communication room, that is, the number of the mobile phones of the on-site audience added to the communication room. After receiving the on-line number of people in the communication room sent by the WebSocket server, the on-site computer may display on the display screen that currently how many people are well prepared.

When the master operates the page program run on the on-site computer to start an interaction step, the page program run on the on-site computer synchronously broadcasts a start instruction to the communication room of the WebSocket server. The WebSocket server sends a task event to the mobile phones of the on-site audiences. The on-site audiences start and display the interaction interface in the mobile phone, and may give a thumbs-up on the interaction interface. At the same time when the on-site audiences give thumbs-ups, the mobile phones may broadcast the number of thumbs-ups to the communication room of the WebSocket server. After receiving the number of thumbs-ups sent by each mobile phone, the WebSocket server performs combined processing on the number, and synchronously sends the total number of thumbs-ups to the on-site computer. The display screen of the on-site computer may synchronously display the total number of thumbs-ups of all on-site audiences currently. The server or on-site computer may check whether the predetermined value in the predetermined condition is reached when receiving the total number of thumbs-ups of all on-site audiences currently. If the predetermined value in the predetermined condition is reached, the on-site computer may broadcast to the communication room of the WebSocket server that the task event has been completed, and trigger to broadcast a red envelope falling animation. In this embodiment of this application, at the same time of playing the red envelope falling animation, the computer may send animation information of the animation to the WebSocket server. When the WebSocket server determines, according to the animation information, that the red envelopes disappear at the edge of the computer screen, the WebSocket server may control the mobile phones of the on-site audience to display an animation that the red envelopes enter the screens of the mobile phones. As shown in FIG. 4, the red envelopes are falling from the on-site computer to the mobile phones of the on-site computer. The WebSocket server may synchronously send the red envelopes to the mobile phones of the on-site audiences according to a rhythm of the falling red envelopes, or the WebSocket server requests a WeChat application server to send the red envelopes to the mobile phones of the on-site audiences. As shown in FIG. 4, the WebSocket server may synchronously send the red envelopes to the mobile phones of the on-site audiences according to the rhythm of the falling red envelopes. The on-site audiences may take the red envelopes displayed in the mobile phones, and then complete the entire off-line service in a red envelope interaction form.

In this embodiment, real-time communication may be implemented by means of the WebSocket technology. The event processing method in this embodiment can be implemented by means of the ordinary HTML page technology. Moreover, real-time communication is implemented, and there is nearly no delay when the event object transits from the screen of the computer to the mobile phones of the users.

Figure 5:
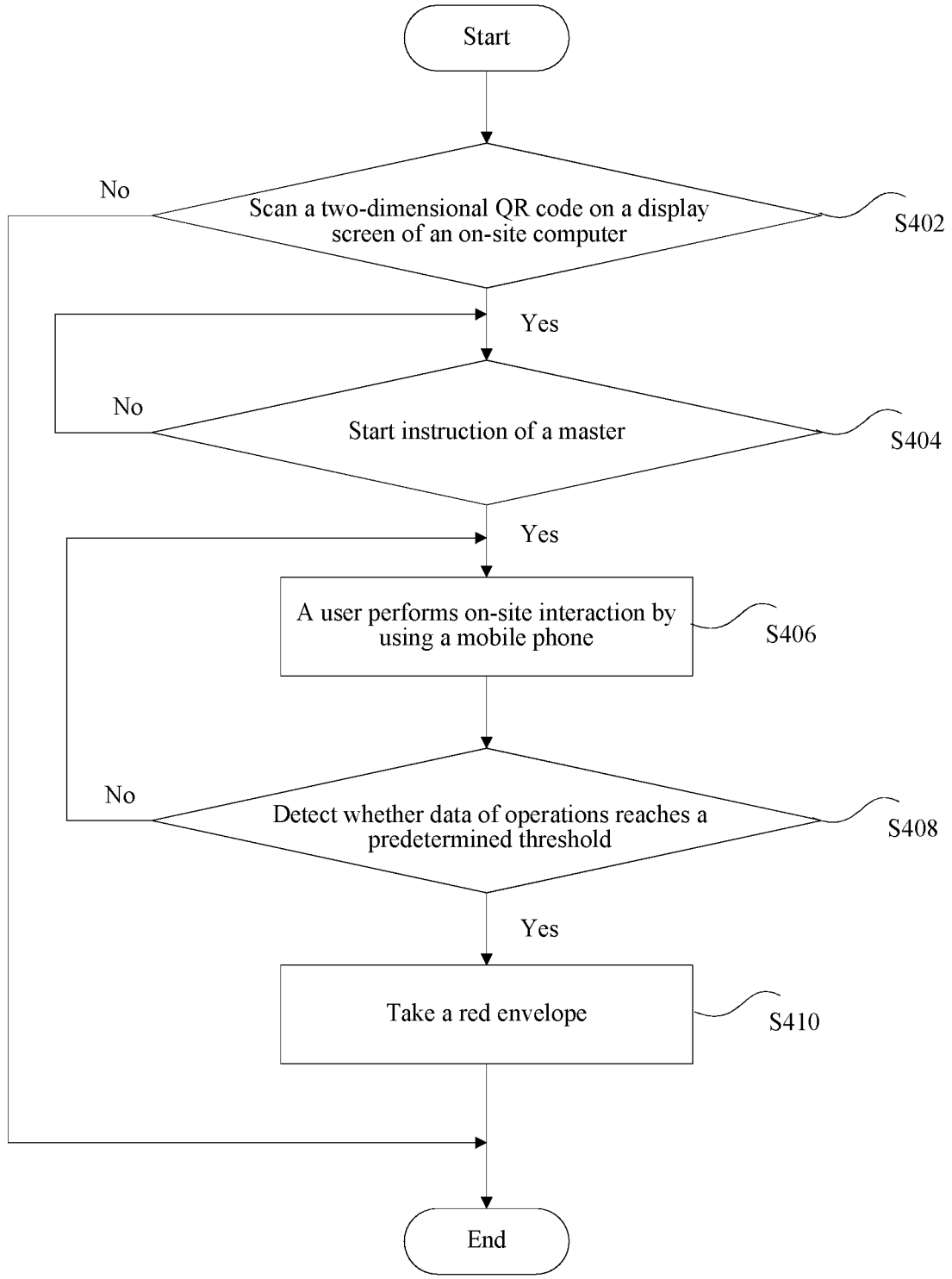
FIG. 5 is a flowchart of a user operation according to an embodiment of this application.

FIG. 5 is a flowchart of a user operation according to an embodiment of this application. As shown in FIG. 5, a user operation procedure may include the following steps:

In step S402, a user scans a two-dimensional QR code on a display screen of an on-site computer by using a mobile phone, to enter an interaction page.

In step S404, wait for a start instruction of an off-line service master.

In step S406, when the master initiates the start instruction, the screen of the on-site computer displays an operation interface, and the user performs on-site interaction by using the mobile phone, for example, tapping the screen of the mobile phone to give a thumbs-up, or playing a small game on the mobile phone such as a "mobile phone gold ingot game". The user performs on-site interaction by using the mobile phone, and data of operations executed by the user by using the mobile phone will be displayed in real time on the screen of the computer.

In step S408, detect whether data of operations reaches a predetermined threshold.

In step S410, when the data of the operations reaches the predetermined value, the screen of the computer displays a prompt of giving red envelopes and starts to play a red envelope falling animation. On-site audiences may see that red envelopes fall from the screen of the computer to their mobile phone in real time, and the on-site audiences take the red envelope award by tapping the red envelope.

This embodiment exists in the form of a page. When the computer runs the page, a two-dimensional QR code will be displayed to be scanned by the on-site users, and interaction start. The interaction herein may be that the users finish an H5 small game on the mobile phone together, give thumbs-ups together, shout encouragements together, and the like. An interaction form may be arbitrary, and details are not limited herein. When the on-site users reach an interaction target, the computer will prompt that there will be red envelopes, and the red envelopes fall from the screen of the computer in an animation form. When the fallen red envelopes disappear at the edge of the screen, the red envelopes fall in real time on the mobile phones of the on-site audiences, and then the audiences can open and take the red envelope award. This embodiment is in a vivid and real-time form, and the interest of the users in using the off-line service is greatly improved in such a red envelope interaction manner.

This embodiment of this application is a specific application of the event processing method of this application in off-line services. The event processing method of this application may be applicable to many off-line services. For example, in a shopping mall, audiences give thumbs-ups to a star on a stage, and when the number of thumbs-ups reaches a particular number, red envelope will be burst. The event processing method of this application may further be applicable to other application cases.

To simplify the description, the foregoing method embodiments are described as a series of action combination. But persons of ordinary skill in the art should know that the present application is not limited to any described sequence of the action, as some steps can adopt other sequences or can be executed simultaneously according to the present application. Secondarily, a person skilled in the art should know that the embodiments described in the specification all belong to exemplary embodiments and the involved actions and modules are not necessary for the present application.

Through the foregoing description of the implementations, it is clear to a person skilled in the art that the present disclosure may be implemented by software plus a suitable universal hardware platform, and may also be implemented by hardware. Based on such an understanding, the technical solutions of this application or the part that makes contributions to the related technology may be substantially embodied in the form of a software product. The computer software product is stored in a storage medium (for example, a ROM/RAM, a magnetic disk, or an optical disc), and contains several instructions for instructing a terminal device (which may be a mobile phone, a computer, a server, or a network device) to execute the method according to the embodiments of this application.

Figure 6:
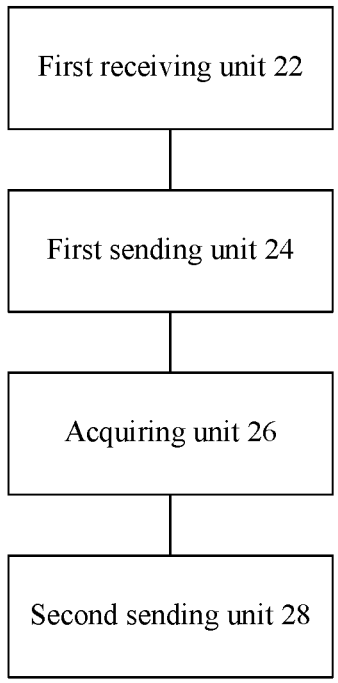
FIG. 6 is a schematic structural diagram of an event processing apparatus according to an embodiment of this application.

According to an embodiment of this application, an event processing apparatus is further provided to implement the foregoing event processing method. FIG. 6 is a schematic structural diagram of an event processing apparatus according to an embodiment of this application. As shown in FIG. 6, the apparatus may include:

a first receiving unit 22, configured to receive a first communication request of a first terminal device and a second communication request of a second terminal device, and add the first terminal device and the second terminal device to a same communication room, where the second terminal device includes one or more terminal devices;

a first sending unit 24, configured to send a to-be-executed task event to the second terminal device;

an acquiring unit 26, configured to acquire an event result obtained after the second terminal device executes the task event; and a second sending unit 28, configured to send an event object corresponding to the task event to the second terminal device or request a server to send the event object corresponding to the task event to the second terminal device, when the event result satisfies a predetermined condition.

The first receiving unit 22 in this embodiment may be configured to execute step S202 in the embodiment shown in FIG. 2. The first sending unit 24 in this embodiment may be configured to execute step S204 in the embodiment shown in FIG. 2. The acquiring unit 26 in this embodiment may be configured to execute step S206 in the embodiment shown in FIG. 2. The second sending unit 28 in this embodiment may be configured to execute step S208 in the embodiment shown in FIG. 2.

By means of the event processing apparatus, a technical problem that interaction with a user cannot be performed before an event object is sent due to the use of a manner of periodically sending the event object by a back end is further resolved, and a technical effect of improving interactivity between a server and a terminal device is achieved.

In this embodiment of this application, examples and application scenarios implemented by the foregoing modules are the same as that implemented in the corresponding steps, but are not limited to the content disclosed in the embodiment shown in FIG. 2. In this embodiment of this application, the foregoing modules may be run in the hardware environment shown in FIG. 1 as a part of the apparatus, or may be implemented by software, or may be implemented by hardware.

Figure 7:
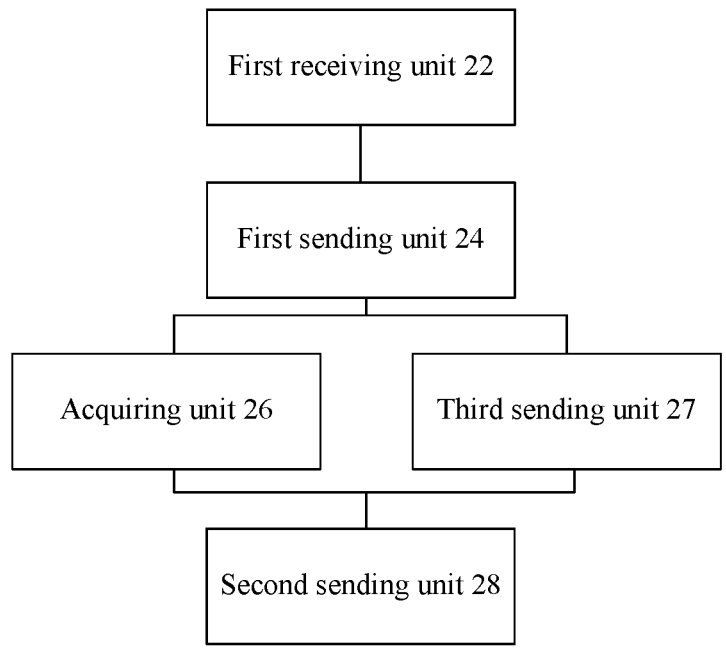
FIG. 7 is a schematic structural diagram of another event processing apparatus according to an embodiment of this application.

FIG. 7 is a schematic structural diagram of another event processing apparatus according to an embodiment of this application. As shown in FIG. 7, this embodiment may further include: a third sending unit 27, configured to: when the event result obtained after the second terminal device executes the task event is acquired, synchronously send the event result to the first terminal device and/or the second terminal device.

The third sending unit 27 in this embodiment may be configured to execute S207 in the embodiment shown in FIG. 3. In this embodiment of this application, examples and application scenarios implemented by the foregoing module are the same as that implemented in the corresponding steps, but are not limited to the content disclosed in the embodiment shown in FIG. 2. In this embodiment of this application, the foregoing module can be run in the hardware environment shown in FIG. 1 as a part of the apparatus, and may be implemented by software or may be implemented by hardware.

Figure 8:
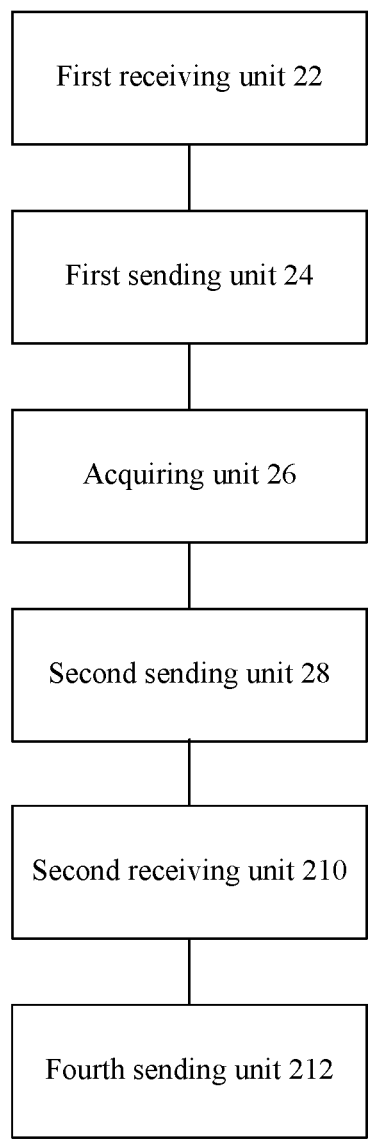
FIG. 8 is a schematic structural diagram of another event processing apparatus according to an embodiment of this application.

FIG. 8 is a schematic diagram of another event processing apparatus according to an embodiment of this application. As shown in FIG. 8, this embodiment may further include:

a second receiving unit 210, configured to: after the event object corresponding to the task event is sent to the second terminal device, receive an operation response returned by one or more terminal devices in the second terminal device, the operation response being used for indicating that the one or more terminal devices in the second terminal device have executed a predetermined operation on the event object; and a fourth sending unit 212, configured to send a predetermined event resource to the one or more terminal devices in the second terminal device.

In this embodiment of this application, the second receiving unit 210 in this embodiment may be configured to execute step S210 in the embodiment shown in FIG. 3. The fourth sending unit 212 in this embodiment may be configured to execute step S212 in the embodiment shown in FIG. 3. In this embodiment of this application, examples and application scenarios implemented by the foregoing modules are the same as that implemented in the corresponding steps, but are not limited to the content disclosed in the embodiment shown in FIG. 2. In this embodiment of this application, the foregoing modules can be run in the hardware environment shown in FIG. 1 as a part of the apparatus, and may be implemented by software or may be implemented by hardware.

Figure 9:
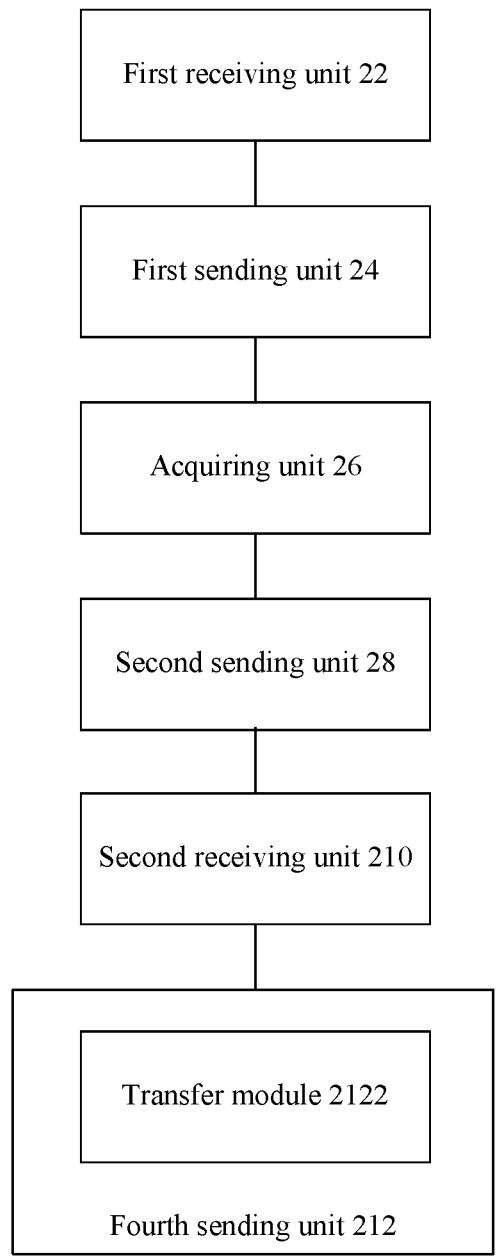
FIG. 9 is a schematic structural diagram of another event processing apparatus according to an embodiment of this application.

FIG. 9 is a schematic structural diagram of another event processing apparatus according to an embodiment of this application. As shown in FIG. 9, the fourth sending unit 212 may include: a transfer module 2122, configured to transfer the event resource into a first account, the first account being a login account of the one or more terminal devices in the second terminal device.

In this embodiment of this application, examples and application scenarios implemented by the module are the same as that implemented in the corresponding steps, but are not limited to the content disclosed in the embodiment shown in FIG. 2. In this embodiment of this application, the foregoing module can be run in the hardware environment shown in FIG. 1 as a part of the apparatus, and may be implemented by software or may be implemented by hardware.

Figure 10:
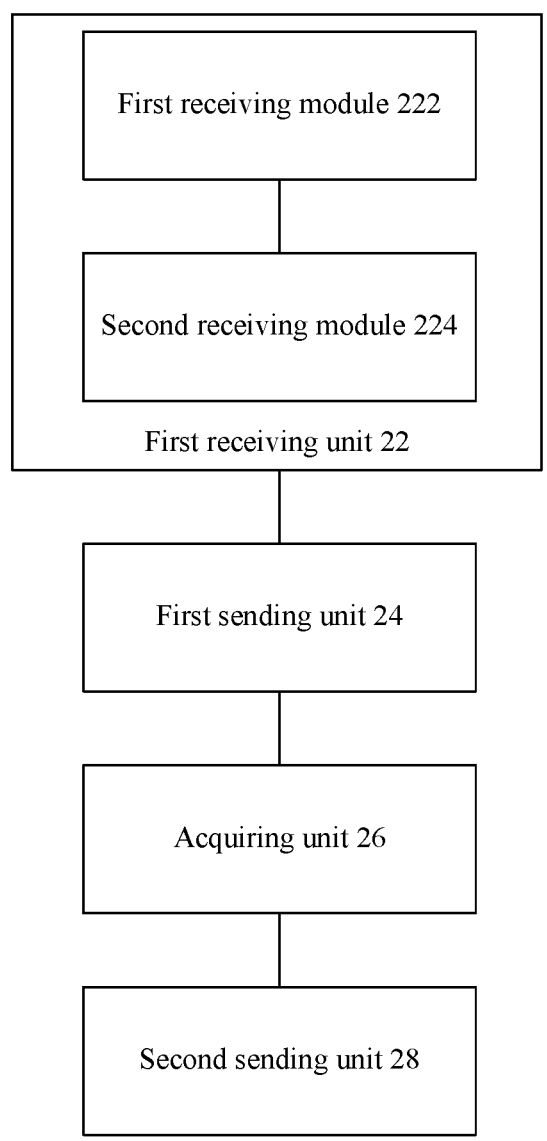
FIG. 10 is a schematic structural diagram of another event processing apparatus according to an embodiment of this application.

FIG. 10 is a schematic structural diagram of another event processing apparatus according to an embodiment of this application. As shown in FIG. 10, the first receiving module 22 may further include:

a first receiving module 222, configured to receive the first communication request of the first terminal device, establish a communication connection to the first terminal device, and add the first terminal device to the communication room; and a second receiving module 224, configured to receive the second communication request of the second terminal device, establish a communication connection to the second terminal device, and add the second terminal device to the communication room.

The first receiving module 222 in this embodiment may be configured to execute step S2022 in the embodiment shown in FIG. 3. The second receiving module 224 in this embodiment may be configured to execute step S2024 in the embodiment shown in FIG. 3. In this embodiment of this application, examples and application scenarios implemented by the foregoing modules are the same as that implemented in the corresponding steps, but are not limited to the content disclosed in the embodiment shown in FIG. 2. In this embodiment of this application, the foregoing modules can be run in the hardware environment shown in FIG. 1 as a part of the apparatus, and may be implemented by software or may be implemented by hardware.

Figure 11:
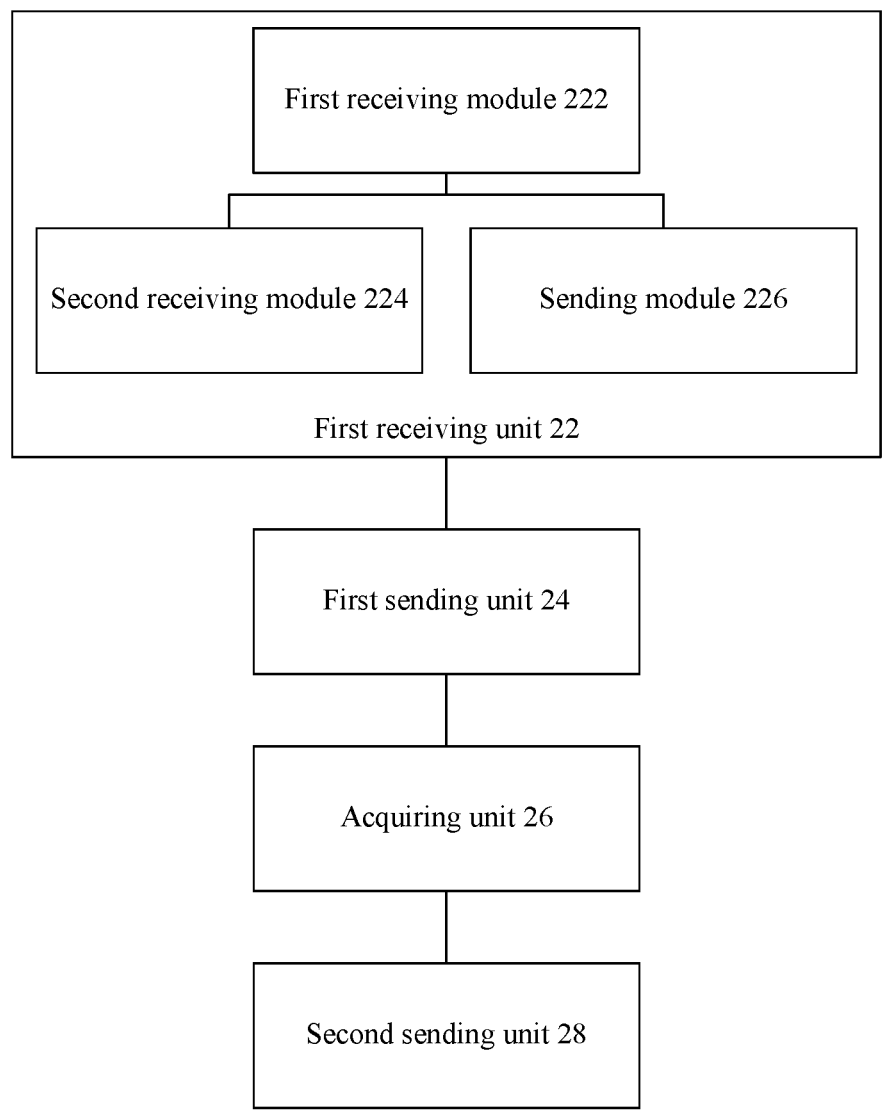
FIG. 11 is a schematic structural diagram of another event processing apparatus according to an embodiment of this application.

FIG. 11 is a schematic structural diagram of another event processing apparatus according to an embodiment of this application. As shown in FIG. 11, the first receiving unit 22 may further include: a sending module 226, configured to: when the second terminal device is added to the communication room, synchronously send the number of second terminal devices that have been added to the communication room to the first terminal device.

The sending module 226 in this embodiment may be configured to execute S2026 in the embodiment shown in FIG. 3. In this embodiment of this application, examples and application scenarios implemented by the module are the same as that implemented in the corresponding steps, but are not limited to the content disclosed in the embodiment shown in FIG. 2. In this embodiment of this application, the foregoing module can be run in the hardware environment shown in FIG. 1 as a part of the apparatus, and may be implemented by software or may be implemented by hardware.

In this embodiment of this application, the event object is a resource transfer request in an instant messaging application, the resource transfer request carrying indication information used for indicating an event resource to be transferred.

Figure 12:
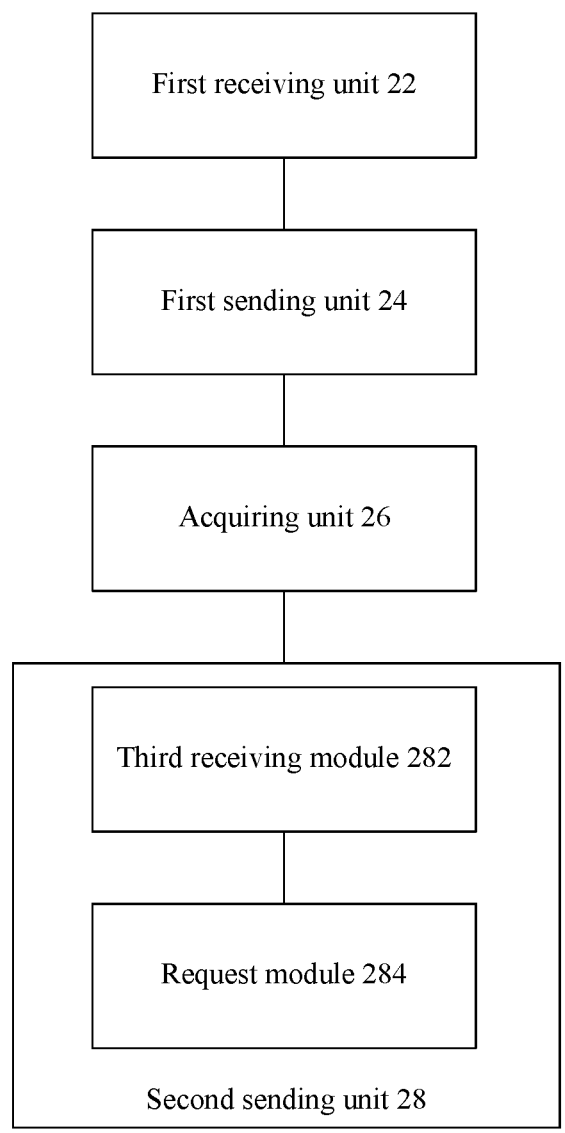
FIG. 12 is a schematic structural diagram of another event processing apparatus according to an embodiment of this application.

FIG. 12 is a schematic structural diagram of another event processing apparatus according to an embodiment of this application. As shown in FIG. 12, the second sending unit 28 may include:

a third receiving module 282, configured to receive animation information of a first animation played on the first terminal device, the first animation being used for displaying movement of the event object from a predetermined position along a predetermined trajectory on the first terminal device until disappearing at an edge of a screen of the first terminal device; and a request module 284, configured to: when the animation information indicates that the event object in the first animation disappears at the edge of the screen of the first terminal device, instruct the second terminal device to play a second animation, and request the server to send the event object corresponding to the task event to the second terminal device, the second animation being used for displaying the event object on a screen of the second terminal device.

The third receiving module 282 in this embodiment may be configured to execute step S2082 in the embodiment shown in FIG. 3. The request module 284 in this embodiment may be configured to execute step S2084 in the embodiment shown in FIG. 3. In this embodiment of this application, examples and application scenarios implemented by the foregoing modules are the same as that implemented in the corresponding steps, but are not limited to the content disclosed in the embodiment shown in FIG. 2. In this embodiment of this application, the foregoing module can be run in the hardware environment shown in FIG. 1 as a part of the apparatus, and may be implemented by software or may be implemented by hardware.

According to an embodiment of this application, a server or a terminal configured to implement the foregoing event processing method is further provided.

Figure 13:
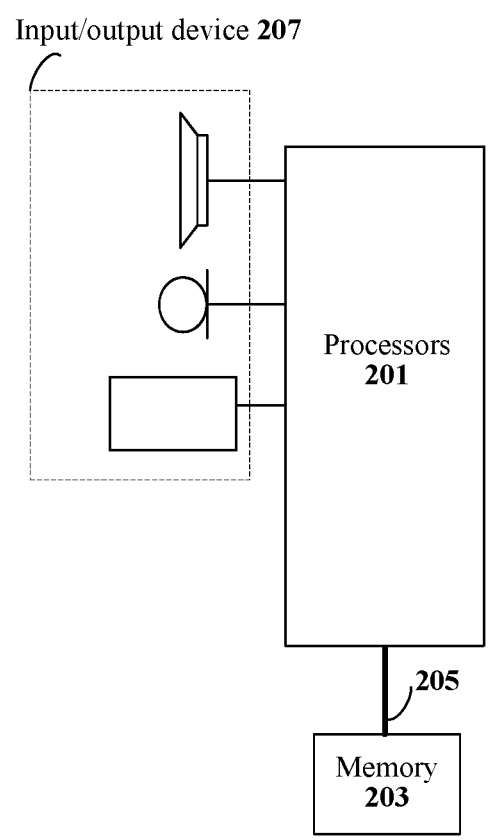
FIG. 13 is a structural block diagram of a terminal according to an embodiment of this application.

FIG. 13 is a structural block diagram of a terminal according to an embodiment of this application. As shown in FIG. 13, the terminal may include: one or more processors 201 (only one is shown in the figure), a memory 203, and a transmission apparatus 205 (the sending apparatus in the foregoing embodiments). As shown in FIG. 13, the terminal may further include an input/output device 207.

The memory 203 may be configured to store one or more computer readable instructions such as a software program and a module, and a program instruction/module corresponding to the event processing method and apparatus in the embodiments of this application. The processor 201 runs the software program and module stored in the memory 203, to implement various functional applications and data processing, that is, to implement the foregoing event processing method. The memory 203 may include a high speed random access memory, and may further include a non-volatile memory, for example, one or more magnetic storage apparatuses, a flash memory, or another non-volatile solid-state memory. In some examples, the memory 203 may further include a memory disposed remote to the processor 201, and the memory may be connected to the terminal through a network. Examples of the network include but are not limited to, the Internet, an intranet, a local area network, a mobile communications network, and a combination thereof.

The transmission apparatus 205 is configured to receive or send data by means of a network, or may further be configured to transmit data between the processor and the memory. Specific examples of the foregoing network may include a wired network and a wireless network. In an example, the transmission apparatus 205 includes a network interface controller (NIC), which may be connected to another network device and router by using a cable, so as to communicate with the Internet or a local area network. In an example, the transmission apparatus 205 is a radio frequency (RF) module, which communicates with the Internet in a wireless manner.

Specifically, the memory 203 is configured to store one or more computer readable instructions such as an application program. In this embodiment, the application programs stored in the memory 203 include: a first receiving instruction, a first sending instruction, an acquiring instruction, and a second sending instruction.

The processor 201 may call, by using the transmission apparatus 205, the application programs stored in the memory 203, to execute the following steps: receiving a first communication request of a first terminal device and a second communication request of a second terminal device, and adding the first terminal device and the second terminal device to a same communication room, where the second terminal device includes one or more terminal devices; sending a to-be-executed task event to the second terminal device; acquiring an event result obtained after the second terminal device executes the task event; and sending an event object corresponding to the task event to the second terminal device or requesting a server to send the event object corresponding to the task event to the second terminal device, when the event result satisfies a predetermined condition.

In this embodiment of this application, the application programs stored in the memory 203 further include a third sending instruction. The processor 201 is further configured to execute the following steps by calling the application programs stored in the memory 203: synchronously sending the event result to the first terminal device and/or the second terminal device during acquiring of the event result obtained after the second terminal device executes the task event.

In this embodiment of this application, the application programs stored in the memory 203 further include a second receiving instruction and a fourth sending instruction. The processor 201 is further configured to call the application programs stored in the memory 203 to execute the following steps: after sending an event object corresponding to the task event to the second terminal device, receiving an operation response returned by one or more terminal devices in the second terminal device, the operation response being used for indicating that the one or more terminal devices in the second terminal device have executed a predetermined operation on the event object; and sending a predetermined event resource to the one or more terminal devices in the second terminal device.

In this embodiment of this application, the processor 201 is further configured to call the application programs stored in the memory 203 to execute the following steps: transferring the event resource into a first account, the first account being a login account of the one or more terminal devices in the second terminal device.

In this embodiment of this application, the processor 201 is further configured to call the application programs stored in the memory 203 to execute the following steps: receiving the first communication request of the first terminal device, establishing a communication connection to the first terminal device, and adding the first terminal device to the communication room; and receiving the second communication request of the second terminal device, establishing a communication connection to the second terminal device, and adding the second terminal device to the communication room.

In this embodiment of this application, the processor 201 is further configured to call the application programs stored in the memory 203 to execute the following steps: during the adding the second terminal device to the communication room, synchronously sending the number of second terminal devices that have been added to the communication room to the first terminal device.

In this embodiment of this application, the processor 201 is further configured to call the application programs stored in the memory 203 to execute the following steps: receiving animation information of a first animation played on the first terminal device, the first animation being used for displaying movement of the event object from a predetermined position along a predetermined trajectory on the first terminal device until disappearing at an edge of a screen of the first terminal device; and when the animation information indicates that the event object in the first animation disappears at the edge of the screen of the first terminal device, instructing the second terminal device to play a second animation, and requesting the server to send the event object corresponding to the task event to the second terminal device, the second animation being used for displaying the event object on a screen of the second terminal device.

By means of this embodiment of this application, an event processing solution is provided. A to-be-executed task event is sent to a terminal device, an event result obtained after the terminal device executes the task event is acquired, and an event object corresponding to the task event is sent to the terminal device, when the event result satisfies a predetermined condition, so that interaction with the terminal device is performed before the event object corresponding to the task event is sent, a technical effect of improving interactivity between a server and the terminal device is achieved, and a technical problem that interaction with a user cannot be performed before an event object is sent due to the use of a manner of periodically sending the event object by a back end is further resolved.

For a specific example in this embodiment, refer to the examples described in the embodiment shown in FIG. 2 and the embodiment shown in FIG. 6, and details are not described herein again in this embodiment.

A person of ordinary skill in the art may understand that the structure shown in FIG. 13 is merely an example, and the terminal may be a terminal device such as a smartphone (for example, an Android mobile phone and an iOS mobile phone), a tablet computer, a palmtop computer, a mobile Internet device (MID), and a PAD. FIG. 13 is not intended to limit the structure of the foregoing electronic apparatus. For example, the terminal may further include more or less components (for example, a network interface and a display apparatus) than those shown in FIG. 13, or have configuration different with that shown in FIG. 13.

A person of ordinary skill in the art may understand that all or part of the steps of the methods in the embodiments may be implemented by a program by instructing hardware relevant to a terminal device. The program may be stored in a computer readable storage medium, and the storage medium may be a flash drive, a read-only memory (ROM), a random access memory (RAM), a magnetic disk, an optical disk, and so on.

An embodiment of this application further provides a storage medium. In this embodiment, the storage medium may store program code used for implementing the foregoing event processing method.

In this embodiment, the foregoing storage medium may be located on at least one of multiple network devices in the network shown in the foregoing embodiments.

In this embodiment, the storage medium is set to store program code used for executing the following steps:

receiving a first communication request of a first terminal device and a second communication request of a second terminal device, and adding the first terminal device and the second terminal device to a same communication room, where the second terminal device includes one or more terminal devices;

sending a to-be-executed task event to the second terminal device;

acquiring an event result obtained after the second terminal device executes the task event; and sending an event object corresponding to the task event to the second terminal device or requesting a server to send the event object corresponding to the task event to the second terminal device, when the event result satisfies a predetermined condition.

The storage medium is further set to store program code used for executing the following steps: during the acquiring an event result obtained after the second terminal device executes the task event, synchronously sending the event result to the first terminal device and/or the second terminal device.

The storage medium is further set to store program code used for executing the following steps: after the sending an event object corresponding to the task event to the second terminal device, receiving an operation response returned by one or more terminal devices in the second terminal device, the operation response being used for indicating that the one or more terminal devices in the second terminal device have executed a predetermined operation on the event object; and sending a predetermined event resource to the one or more terminal devices in the second terminal device.

The storage medium is further set to store program code used for executing the following steps: transferring the event resource into a first account, the first account being a login account of the one or more terminal devices in the second terminal device.

The storage medium is further set to store program code used for executing the following steps: receiving the first communication request of the first terminal device, establishing a communication connection to the first terminal device, and adding the first terminal device to the communication room; and receiving the second communication request of the second terminal device, establishing a communication connection to the second terminal device, and adding the second terminal device to the communication room.

The storage medium is further set to store program code used for executing the following steps: during the adding the second terminal device to the communication room, synchronously sending the number of second terminal devices that have been added to the communication room to the first terminal device.

The storage medium is further set to store program code used for executing the following steps: receiving animation information of a first animation played on the first terminal device, the first animation being used for displaying movement of the event object from a predetermined position along a predetermined trajectory on the first terminal device until disappearing at an edge of a screen of the first terminal device; and when the animation information indicates that the event object in the first animation disappears at the edge of the screen of the first terminal device, instructing the second terminal device to play a second animation, and requesting the server to send the event object corresponding to the task event to the second terminal device, the second animation being used for displaying the event object on a screen of the second terminal device.

For a specific example in this embodiment, refer to the examples described in the embodiment shown in FIG. 2 and the embodiment shown in FIG. 6, and details are not described herein again in this embodiment.

In the embodiments of this application, the foregoing storage medium includes, but is not limited to: any medium that can store program code, such as a USB flash drive, a read-only memory (ROM), a random access memory (RAM), a removable hard disk, a magnetic disk, or an optical disc.

The sequence numbers of the preceding embodiments of this application are merely for description purpose but do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solutions of the embodiments of this application essentially, or the part contributing to the prior art, or all or some of the technical solutions may be implemented in a form of a software product. The computer software product is stored in a storage medium and includes several instructions for instructing one or more computer devices (which may be a personal computer, a server, a network device, or the like) to execute all or some of the steps of the methods described in the embodiments of this application.

In the foregoing embodiments of this application, descriptions of the embodiments have different emphases, and as for parts that are not described in detail in one embodiment, reference can be made to the relevant description of the other embodiments.

In the several embodiments provided in this application, it should be understood that the disclosed client may be implemented in other manners. For example, the described apparatus embodiments are merely exemplary. For example, the unit division is merely logical function division and may be other division during implementation. For example, multiple units or components may be combined or integrated into another system, or some features may be ignored or not executed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The above descriptions are merely implementations of this application, and it should be noted that, a person of ordinary skill in the art may make various improvements and refinements without departing from the spirit of this application. All such modifications and refinements should also be intended to be covered by this application.

What is claimed is:

1. A method, comprising:
receiving, by a server system, a first communication request from a first terminal device and a second communication request from one or more second terminal devices;
adding, by processing circuitry of the server system, the first terminal device and the one or more second terminal devices to a same communication group;
sending, by the server system to the one or more second terminal devices via the same communication group, a task to be executed at the one or more second terminal devices;
receiving, by the server system, a task execution result associated with task execution by the one or more second terminal devices that execute the task; and
in response to a determination that the task execution result satisfies a predetermined condition:
(i) receiving, by the server system, animation information of a first animation that is displayed on the first terminal device, the first animation corresponding to movement of an event object on a first screen of the first terminal device, the event object being associated with the task, and (ii) sending, by the server system, the event object to the one or more second terminal devices that execute the task.

2. The method according to claim 1, wherein the sending, by the server system, the event object comprises:
requesting, by a first server device of the server system, a second server device of the server system to send the event object; and
sending, by the second server device of the server system, the event object to the one or more second terminal devices that execute the task.

3. The method according to claim 1, further comprising:
determining a task result based on the task execution result; and
sending the task result to one or a combination of the first terminal device and the one or more second terminal devices that execute the task.

4. The method according to claim 1, further comprising:
receiving an operation response from a second terminal device of the one or more second terminal devices that execute the task, the operation response indicating that the second terminal device has executed a predetermined operation associated with the event object; and
sending an event resource to the second terminal device.

5. The method according to claim 4, wherein the sending the event resource to the second terminal device comprises:
transferring the event resource into a login account of the second terminal device.

6. The method according to claim 1, wherein the adding the first terminal device and the one or more second terminal devices to the same communication group comprises:
establishing a first communication connection with the first terminal device, and adding the first terminal device to the same communication group; and
establishing a second communication connection to each of the one or more second terminal devices, and adding the one or more second terminal devices to the same communication group.

7. The method according to claim 6, further comprising:
sending a number of the one or more second terminal devices that have been added to the same communication group to the first terminal device.

8. The method according to claim 1, wherein the event object is a resource transfer request in an instant messaging application, the resource transfer request indicating an event resource to be transferred.

9. The method according to claim 2, wherein the first animation causes the movement of the event object to start from a predetermined position, move along a predetermined trajectory, and disappear from an edge of the first screen, and
when the event object in the first animation disappears from the edge of the first screen of the first terminal device, the sending, by the second server device of the server system, the event object further includes: (i) instructing the one or more second terminal devices that execute the task to display a second animation, and (ii) requesting the second server device to send the event object to the one or more second terminal devices that execute the task, the second animation corresponding to movement of the event object on at least a second screen of the one or more second terminal devices that execute the task.

10. An information processing system, comprising:
one or more servers including processing circuitry configured to:
receive a first communication request from a first terminal device and a second communication request from one or more second terminal devices,
add the first terminal device and the one or more second terminal devices to a same communication group,
send, to the one or more second terminal devices, a task to be executed at the one or more second terminal devices,
receive a task execution result associated with task execution by the one or more second terminal devices that execute the task, and
in response to a determination that the task execution result satisfies a predetermined condition:
(i) receive animation information of a first animation that is displayed on the first terminal device, the first animation corresponding to movement of an event object on a first screen of the first terminal device, the event object being associated with the task, and
(ii) send the event object to the one or more second terminal devices that execute the task.

11. The information processing system according to claim 10, wherein the one or more servers include a first server device and a second server device, the first server device is configured to request the second server device of the information processing system to send the event object, and the second server device is configured to send the event object to the one or more second terminal devices that execute the task.

12. The information processing system according to claim 10, wherein the processing circuitry is further configured to:
determine a task result based on the task execution result, and
send the task result to one or a combination of the first terminal device and the one or more second terminal devices that execute the task.

13. The information processing system according to claim 10, wherein the processing circuitry is further configured to:
receive an operation response from a second terminal device of the one or more second terminal devices that execute the task, the operation response indicating that the second terminal device has executed a predetermined operation associated with the event object, and
send an event resource to the second terminal device.

14. The information processing system according to claim 13, wherein the processing circuitry is further configured to:
transfer the event resource into a login account of the second terminal device.

15. The information processing system according to claim 10, wherein the processing circuitry is further configured to:
establish a first communication connection with the first terminal device, and add the first terminal device to the same communication group, and
establish a second communication connection to each of the one or more second terminal devices, and add the one or more second terminal devices to the same communication group.

16. The information processing system according to claim 15, wherein the processing circuitry is further configured to:
send a number of the one or more second terminal devices that have been added to the same communication group to the first terminal device.

17. The information processing system according to claim 10, wherein the event object is a resource transfer request in an instant messaging application, the resource transfer request indicating an event resource to be transferred.

18. The information processing system according to claim 11, wherein the first animation causes the movement of the event object to start from a predetermined position, move along a predetermined trajectory, and disappear from an edge of the first screen, and when the event object in the first animation disappears from the edge of the first screen of the first terminal device, the processing circuitry is further configured to (i) instruct the one or more second terminal devices that execute the task to display a second animation, and (ii) request the second server device to send the event object to the one or more second terminal devices that execute the task, the second animation corresponding to movement of the event object on at least a second screen of the one or more second terminal devices that execute the task.

19. A non-transitory computer-readable medium having instructions stored therein, which when executed by a processor in a server cause the processor to executed a method comprising:

receiving a first communication request from a first terminal device and a second communication request from one or more second terminal devices;

adding the first terminal device and the one or more second terminal devices to a same communication group;

sending, to the one or more second terminal devices via the same communication group, a task to be executed at the one or more second terminal devices;

receiving a task execution result associated with task execution by the one or more second terminal devices that execute the task; and in response to a determination that the task execution result satisfies a predetermined condition:
  (i) receiving, animation information of a first animation that is displayed on the first terminal device, the first animation corresponding to movement of an event object on a first screen of the first terminal device, the event object being associated with the task, and
  (ii) sending the event object to the one or more second terminal devices that execute the task.

* * * * *